United States Patent
Xiong et al.

(10) Patent No.: US 11,961,184 B2
(45) Date of Patent: Apr. 16, 2024

(54) SYSTEM AND METHOD FOR SCENE RECONSTRUCTION WITH PLANE AND SURFACE RECONSTRUCTION

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 17/696,746

(22) Filed: Mar. 16, 2022

(65) Prior Publication Data
US 2023/0088963 A1    Mar. 23, 2023

Related U.S. Application Data

(60) Provisional application No. 63/245,772, filed on Sep. 17, 2021.

(51) Int. Cl.
*G06T 17/20* (2006.01)
*G06T 7/12* (2017.01)
*G06T 19/00* (2011.01)

(52) U.S. Cl.
CPC ............... *G06T 17/20* (2013.01); *G06T 7/12* (2017.01); *G06T 19/006* (2013.01);
(Continued)

(58) Field of Classification Search
CPC ......... G06T 17/20; G06T 19/006; G06T 7/12; G06T 2200/04; G06T 2200/08; G06T 2207/10012; G06T 2207/20021
See application file for complete search history.

(56) References Cited

U.S. PATENT DOCUMENTS

| | | |
|---|---|---|
| 10,708,486 B2 | 7/2020 | Lee et al. |
| 10,817,724 B2 | 10/2020 | Koul et al. |

(Continued)

FOREIGN PATENT DOCUMENTS

| | | |
|---|---|---|
| CN | 105493155 A1 | 4/2016 |
| JP | 2020198066 A | 12/2020 |
| KR | 102285339 B1 | 8/2021 |

OTHER PUBLICATIONS

Liu, et al. "PlaneRCNN: 3D Plane Detection and Reconstructions from a Single Image", CVPR 2019, 10 pages.
(Continued)

*Primary Examiner* — Michelle Chin

(57) ABSTRACT

A system and method for 3D reconstruction with plane and surface reconstruction, scene parsing, depth reconstruction with depth fusion from different sources. The system includes display and a processor to perform the method for 3D reconstruction with plane and surface reconstruction. The method includes dividing a scene of an image frame into one or more plane regions and one or more surface regions. The method also includes generating reconstructed planes by performing plane reconstruction based on the one or more plane regions. The method also includes generating reconstructed surfaces by performing surface reconstruction based on the one or more surface regions. The method further includes creating the 3D scene reconstruction by integrating the reconstructed planes and the reconstructed surfaces.

20 Claims, 10 Drawing Sheets

(52) U.S. Cl.
CPC ...... *G06T 2200/04* (2013.01); *G06T 2200/08* (2013.01); *G06T 2207/10012* (2013.01); *G06T 2207/20021* (2013.01)

(56) References Cited

U.S. PATENT DOCUMENTS

| | | | |
|---|---|---|---|
| 11,037,362 | B2 | 6/2021 | Shin et al. |
| 2002/0110273 | A1* | 8/2002 | Dufour ............... G06T 7/55 382/154 |
| 2016/0019711 | A1 | 1/2016 | Shapira et al. |
| 2018/0225864 | A1* | 8/2018 | Du ................ G06F 16/5838 |
| 2020/0134923 | A1 | 4/2020 | Seiler et al. |
| 2020/0258144 | A1 | 8/2020 | Chaturvedi et al. |
| 2020/0372710 | A1 | 11/2020 | Wang et al. |
| 2020/0389639 | A1 | 12/2020 | Rhyu |
| 2021/0004630 | A1 | 1/2021 | Uscinski |
| 2021/0065392 | A1 | 3/2021 | Bleyer et al. |
| 2021/0136414 | A1 | 5/2021 | Oh et al. |
| 2021/0327119 | A1* | 10/2021 | Malin ................ G06T 15/04 |

OTHER PUBLICATIONS

International Search Report and Written Opinion of the International Searching Authority dated Dec. 15, 2022 in connection with International Patent Application No. PCT/KR2022/013105, 8 pages.
Knyaz et al., "3D Reconstruction of a Complex Grid Structure Combining UAS Images and Deep Learning," Remote Sensing 2020, vol. 12, No. 19, Sep. 2020, 23 pages.

* cited by examiner

SYSTEM AND METHOD FOR SCENE RECONSTRUCTION WITH PLANE AND SURFACE RECONSTRUCTION

CROSS-REFERENCE TO RELATED APPLICATION AND CLAIM OF PRIORITY

This application claims priority under 35 U.S.C. § 119(e) to U.S. Provisional Patent Application No. 63/245,772 filed on Sep. 17, 2021. The above-identified provisional patent application is hereby incorporated by reference in their entireties

TECHNICAL FIELD

This disclosure relates generally to computer vision and platforms for augmented reality (AR) and extended reality (XR). More specifically, this disclosure relates to a system and method for three-dimensional scene reconstruction.

BACKGROUND

Augmented reality and extended reality experiences, which incorporate digitally controlled content into a user's view of an operating environment (e.g., a real-world environment) through an AR or XR apparatus (for example, a head-mounted display) present unique challenges in terms of managing the limited processing and power resources of the apparatus.

A number of XR devices will be coming to market. In an XR device, 3D scene reconstruction and comprehension can enable virtual objects to interact with the natural objects in the scene. Efficient scene reconstruction enables virtual objects to communicate with a natural scene in real time. In modern XR devices, depth data is provided by multiple sources such as depth sensor, structure from motion, stereo camera pair. Efficient depth fusion and reconstruction approaches are needed to provide fast and high-quality depths to 3D scene reconstruction.

SUMMARY

This disclosure provides a system and method for scene reconstruction with plane and surface reconstruction.

In a first embodiment, a method is provided. The method includes dividing a scene of an image frame into one or more plane regions and one or more surface regions. The method also includes generating reconstructed planes by performing plane reconstruction based on the one or more plane regions. The method also includes generating reconstructed surfaces by performing surface reconstruction based on the one or more surface regions. The method further includes creating the 3D scene reconstruction by integrating the reconstructed planes and the reconstructed surfaces.

In a second embodiment, an apparatus is provided. The apparatus includes a display and a processor. The processor is configured to: divide a scene of an image frame into one or more plane regions and one or more surface regions; generate reconstructed planes by performing plane reconstruction based on the one or more plane regions; generate reconstructed surfaces by performing surface reconstruction based on the one or more surface regions; and create the 3D scene reconstruction by integrating the reconstructed planes and the reconstructed surfaces.

In a third embodiment, a non-transitory computer-readable medium is provided. The non-transitory computer-readable medium contains instructions that, when executed by a processor, causes the processor to: divide a scene of an image frame into one or more plane regions and one or more surface regions; generate reconstructed planes by performing plane reconstruction based on the one or more plane regions; generate reconstructed surfaces by performing surface reconstruction based on the one or more surface regions; and create the 3D scene reconstruction by integrating the reconstructed planes and the reconstructed surfaces.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

In XR systems, 3D scene reconstruction and comprehension can enable virtual objects to interact with the real-world objects in the scene. Efficient scene reconstruction enables virtual objects to interact with the real-world objects in the scene in real time. 3D scene reconstruction and comprehension are important in XR systems. Fast and efficient scene reconstruction is important for virtual objects to interact the 3D scene. In existing 3D scene reconstruction approaches, the scene is composed of 3D surfaces and is reconstructed using surface approaches. In most XR applications, the scene is composed of planes and surfaces. Plane detection and reconstruction is more efficient than conventional surface reconstruction, so replacing surface reconstruction approaches with plane detection and reconstruction for at least a portion of the scene can improve efficiency during 3D scene reconstruction.

A depth map of the scene is used in 3D scene reconstruction. Depth information may be extracted from multiple sources, and efficiently fusing sparse depths from multiple sources and reconstructing dense depth maps during 3D reconstruction also improves overall efficiency of 3D reconstruction.

Embodiments of the present disclosure provide an efficient system and method to reconstruct planes and surfaces in the scene and integrate them together for 3D reconstruction. In modern XR systems, depth data is provided by multiple sources such as depth sensor, structure from motion, stereo camera pair. Certain embodiments provide efficient depth fusion and reconstruction approaches, which provide fast and high-quality depths to 3D scene reconstruction. Embodiments of the present disclosure provide an algorithm, system, and method for scene reconstruction with efficient surface and depth reconstruction techniques and apply the algorithms to XR applications.

Embodiments of the present disclosure provide an algorithm, system, and method for 3D scene reconstruction for XR applications. The system extracts planes to divide the scene into plane regions and surface regions, and then reconstructs planes and surfaces separately, finally integrates the reconstructed planes and surfaces together for 3D scene reconstruction. The system also avoids reconstructing planes with general surface reconstructing approaches to improve efficiency. The system also creates an efficient procedure to fuse sparse depths from different sources such as depth sensors, structure from motion, stereo camera pair and reconstruct depths on the surface reconstruction mesh.

Figure 1:
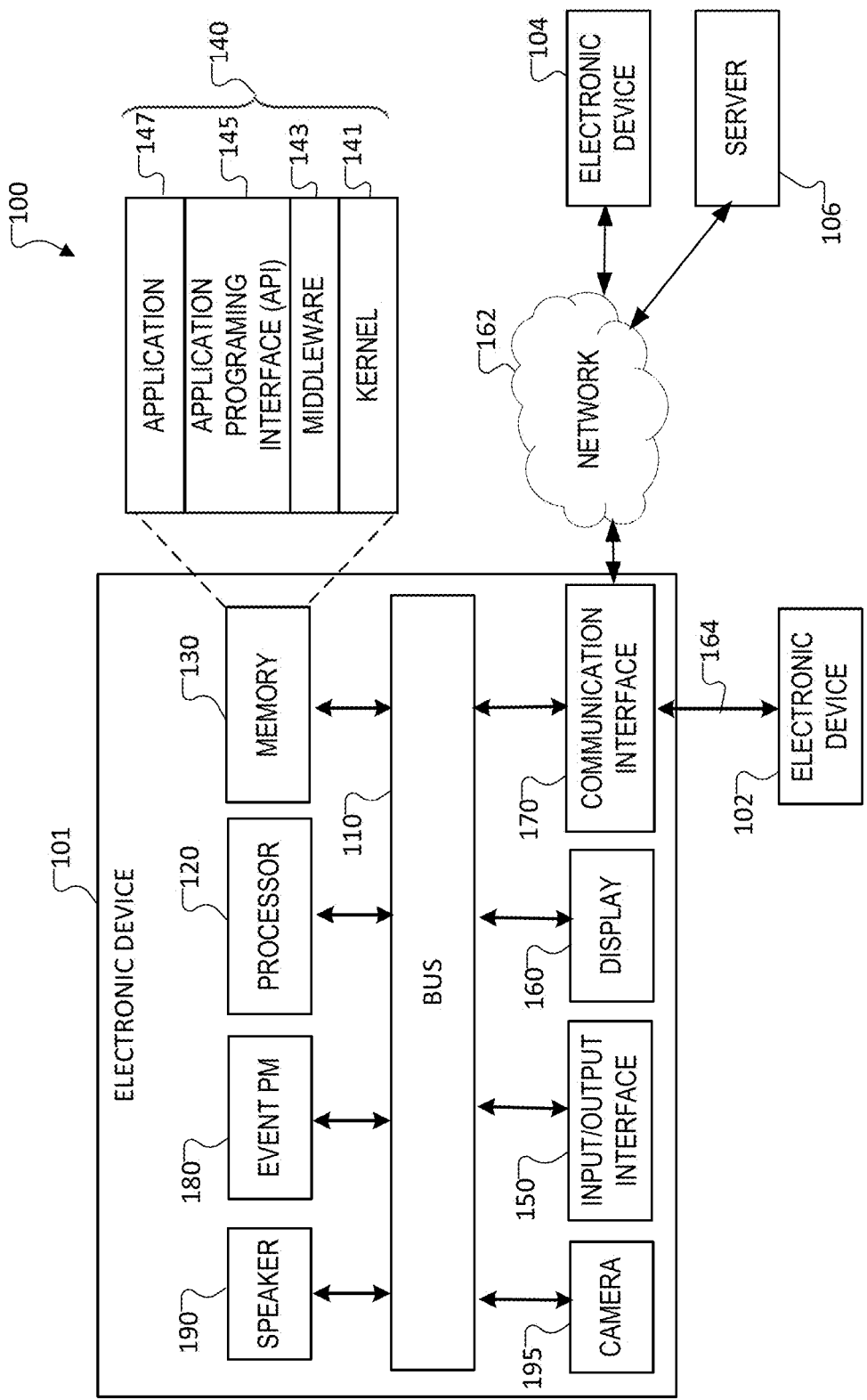
FIG. 1 illustrates an example network configuration including an electronic device according to an embodiment of the present disclosure.

FIG. 1 illustrates an example network configuration 100 in accordance with this disclosure. The embodiment of the network configuration 100 shown in FIG. 1 is for illustration only. Other embodiments could be used without departing from the scope of this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In certain embodiments, camera 195 comprises a stereo camera pair. In some embodiments, the electronic device 101 may exclude at least one of the components or may add another component.

In certain embodiments, electronic device 101 is operating as a platform for providing an XR experience according to some embodiments of this disclosure. According to various embodiments of this disclosure, electronic device 101 could be implemented as one or more of a smartphone, a tablet, or a head-mounted device (HMD) for providing an augmented reality (AR) experience. In some embodiments, electronic device 101 is a wearable device. In certain embodiments, electronic device 101 is configured to couple to a second electronic device 102, which may be a wearable device such as an HMD.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

Applications 147 can include games, social media applications, applications for geotagging photographs and other items of digital content, extended reality (XR) applications, operating systems, device security (e.g., anti-theft and device tracking) applications or any other applications which access resources of electronic device 101, the resources of electronic device 101 including, without limitation, speaker 190, microphone, input/output interface 150, and additional resources. According to some embodiments, applications 147 include applications which can consume or otherwise utilize identifications of planar surfaces in a field of view of visual sensors of electronic device 101.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device. The communication interface 170 may include, for example, a radio frequency (RF) transceiver, a BLUETOOTH transceiver, or a wireless fidelity (WI-FI) transceiver, and the like.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 can be configured to capture still or moving images. For example, the camera 195 can capture a single frame or multiple frames. In certain embodiments, the camera 195 is a single camera. In certain embodiments, the camera 195 is an imaging system that includes multiple cameras. In certain embodiments, the camera 195 comprises a camera disposed beneath the display 160, namely an under-display camera (UDC).

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

The embodiment of device 100 illustrated in FIG. 1 is for illustration only, and other configurations are possible. The embodiment of the device 100 shown in FIG. 1 is for illustration only. It is further noted that suitable devices come in a wide variety of configurations, and FIG. 1 does not limit the scope of this disclosure to any particular implementation of a device. For example, while certain embodiments according to this disclosure are described as being implemented on mobile XR platforms, embodiments according to this disclosure are not so limited, and embodiments implemented on other platforms are within the contemplated scope of this disclosure.

Figure 2:
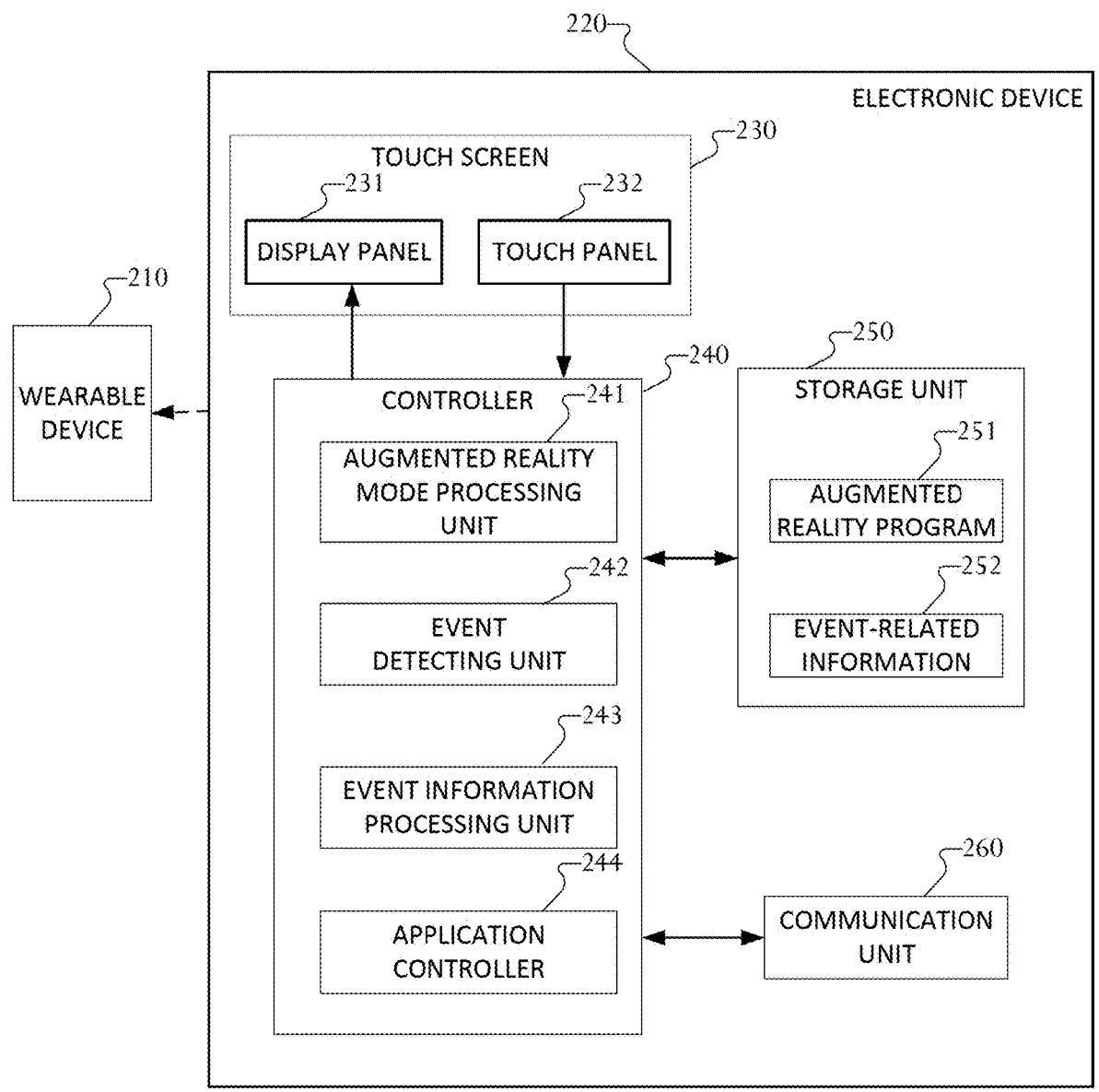
FIG. 2 illustrates an example electronic device according to an embodiment of the present disclosure.

FIG. 2 illustrates an example electronic device 220 according to various embodiments of the present disclosure. The embodiment of the electronic device 220 shown in FIG. 2 is for illustration only. Other embodiments of electronic device 220 could be used without departing from the scope of this disclosure. The electronic device 220 depicted in FIG. 2 can be configured the same as, or similar to, any of electronic devices 101, 102, or 104.

FIG. 2 is a block diagram illustrating an example configuration of an electronic device according to an embodiment of the present disclosure. Referring to FIG. 2, the electronic device 220 according to an embodiment of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to certain embodiments, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event determining unit 242, an event information processing unit 243, or an application controller 244.

In certain embodiments, an electronic device 220 is an HMD that includes display or touchscreen 230. In certain embodiments, the electronic device 220 includes display panel 231 without a touch screen option. According to various embodiments, the display panel 231 can display, in an internally facing direction (e.g., in a direction having a component that is opposite to arrow 201) items of XR content in conjunction with views of objects in an externally facing field of view. According to some embodiments, the display panel 231 is substantially transparent (similar to, for example, the displays used in "smart glasses" or "heads-up displays" on the cockpit glass of an airplane) and views of objects in externally facing fields of view come from light passing through display. According to various embodiments, (sometimes referred to as "mixed reality") the display panel 231 is opaque, and views of objects in externally facing fields of view come from image data from externally oriented cameras (for example, externally oriented camera 195).

In certain embodiments, when the electronic device 220 is mounted in a wearable device 210, the electronic device 220 can operate, e.g., as an HMD, and run an augmented reality mode. Further, according to an embodiment of the present disclosure, even when the electronic device 220 is not mounted in the wearable device 210, the electronic device 220 can run the augmented reality mode according to the user's settings or run an augmented reality mode related application. In the following embodiment, although the electronic device 220 is set to be mounted in the wearable device 210 to run the augmented reality mode, embodiments of the present disclosure are not limited thereto.

According to certain embodiments, when the electronic device 220 operates in the augmented reality mode (e.g., the electronic device 220 is mounted in the wearable device 210 to operate in a head mounted theater (HMT) mode), two screens corresponding to the user's eyes (left and right eye) can be displayed through the display panel 231.

According to certain embodiments, when the electronic device 220 is operated in the augmented reality mode, the controller 240 can control the processing of information related to an event generated while operating in the augmented reality mode to fit in the augmented reality mode and display the processed information. According to certain embodiments, when the event generated while operating in the augmented reality mode is an event related to running an application, the controller 240 can block the running of the application or process the application to operate as a background process or application.

More specifically, according to an embodiment of the present disclosure, the controller 240 can include at least one of an augmented reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to certain embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Further, the event detecting unit 242 can determine whether there is information to be displayed on the display screen in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode depending on the result of determination by the event detecting unit 242. Various methods for processing the event-related information can apply. For example, when a three-dimensional (3D) image is implemented in the augmented reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the augmented reality mode being currently run.

When it is determined by the event detecting unit 242 that there is an application to be run in relation with the event occurring while operating in the augmented reality mode, the application controller 244 performs control to block the running of the application related to the event. According to certain embodiments, when it is determined by the event detecting unit 242 that there is an application to be run in relation with the event occurring while operating in the augmented reality mode, the application controller 244 can perform control so that the application is run in the background so as not to influence the running or screen display of the application corresponding to the augmented reality mode when the event-related application runs.

The storage unit 250 can store an augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the augmented reality mode (or an HMT mode).

According to certain embodiments, upon failure to automatically determine whether the electronic device 220 is mounted when the communication unit 260 is mounted on the wearable device 210, the user can apply various embodiments of the present disclosure by running the augmented reality program 251 or selecting the augmented reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 185 or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231 but exclude the touch panel 232.

According to certain embodiments, the electronic device 220 can be denoted as a first device (or a first electronic device), and the wearable device 210 may be denoted as a second device (or a second electronic device) for ease of description.

According to certain embodiments, an electronic device can comprise a display unit displaying on a screen corresponding to an augmented reality mode and a controller performing control that detects an interrupt according to an occurrence of at least one event, that varies event-related information related to the event in a form corresponding to the augmented reality mode, and that displays the varied event-related information on the display screen that corresponds to the augmented reality mode.

According to certain embodiments, the event can include any one or more selected from among a call reception event, a message reception event, an alarm notification, a scheduler notification, a WI-FI connection, a WI-FI disconnection, a low battery notification, a data permission or use restriction notification, a no application response notification, or an abnormal application termination notification.

According to certain embodiments, the electronic device further comprises a storage unit configured for storing the event-related information when the event is not an event to be displayed in the augmented reality mode, wherein the controller can perform control to display the event-related information stored in the storage unit when the electronic device switches from the virtual reality mode into an augmented reality mode or a see-through (non-augmented reality) mode. According to certain embodiments, the electronic device can further comprise a storage unit that stores information regarding at least one event to be displayed in the augmented reality mode. According to certain embodiments, the event can include an instant message reception notification event. According to certain embodiments, when the event is an event related to running at least one application, the controller can perform control that blocks running of the application according to occurrence of the event. According to certain embodiments, the controller can perform control to run the blocked application when a screen mode of the electronic device switches from a virtual reality mode into an augmented reality mode or a see-through (non-augmented reality) mode. According to certain embodiments, when the event is an event related to running at least one application, the controller can perform control that enables the application, according to the occurrence of the event, to be run on a background of a screen of the augmented reality mode. According to certain embodiments, when the electronic device is connected to a wearable device, the controller can perform control to run the augmented reality mode. According to certain embodiments, the controller can enable the event-related information to be arranged and processed to be displayed in a three-dimensional (3D) space of the augmented reality mode screen being displayed on a current display screen. According to certain embodiments, the electronic device 220 can include additional sensors such as one or more red, green, blue (RGB) cameras, dynamic vision sensor (DVS) cameras, 360-degree cameras, or a combination thereof.

Figure 3:
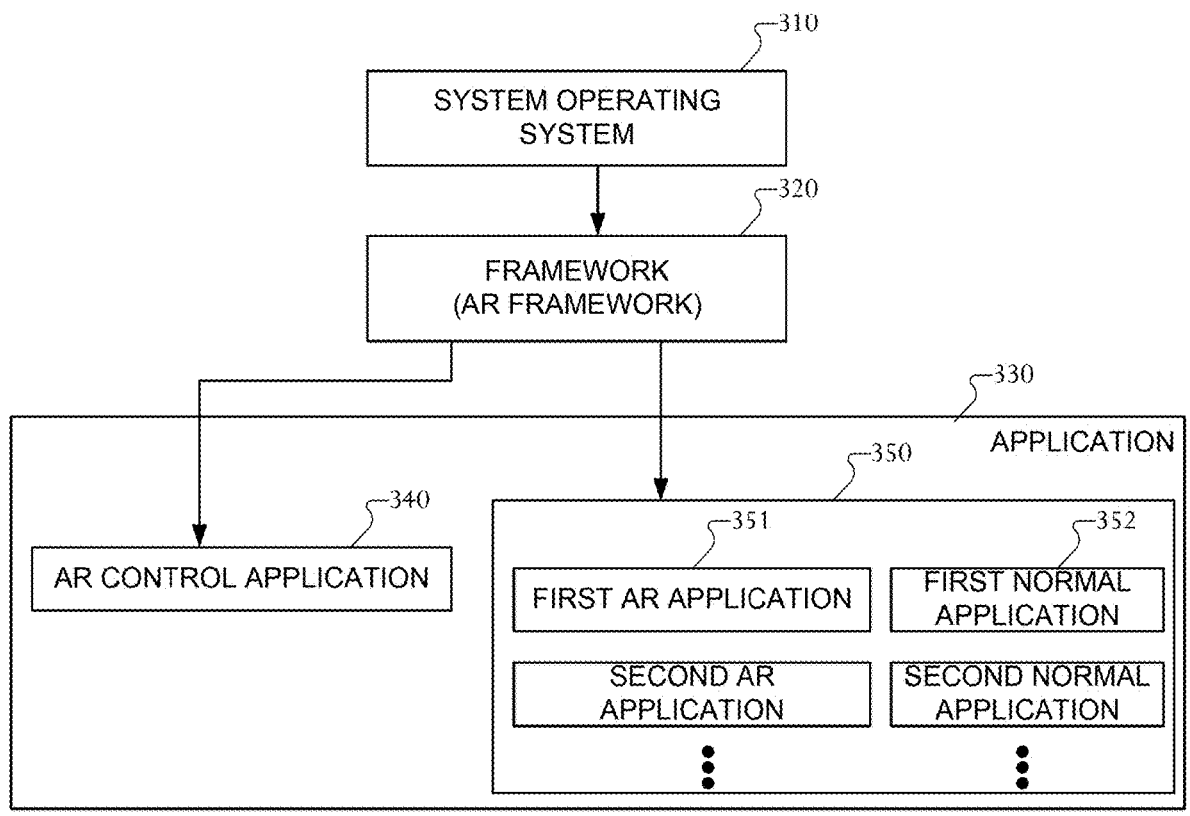
FIG. 3 is a block diagram illustrating a program module according to an embodiment of the present disclosure.
Figure 4A:
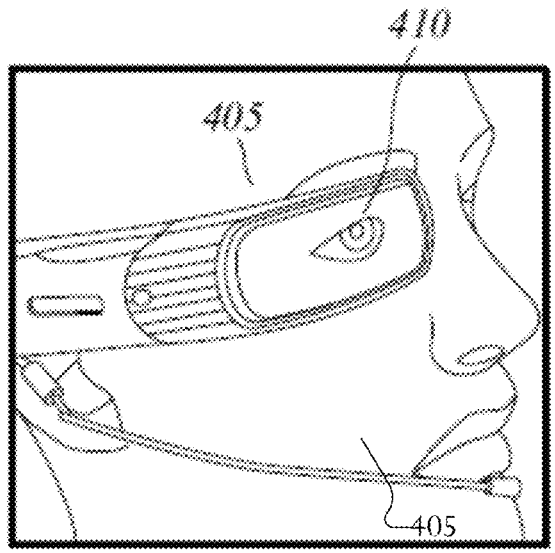
FIGS. 4A-4D illustrate examples of a head mounted display (HMD) for use in augmented reality, mixed reality, or virtual reality according to an embodiment of the present disclosure.
Figure 4B:
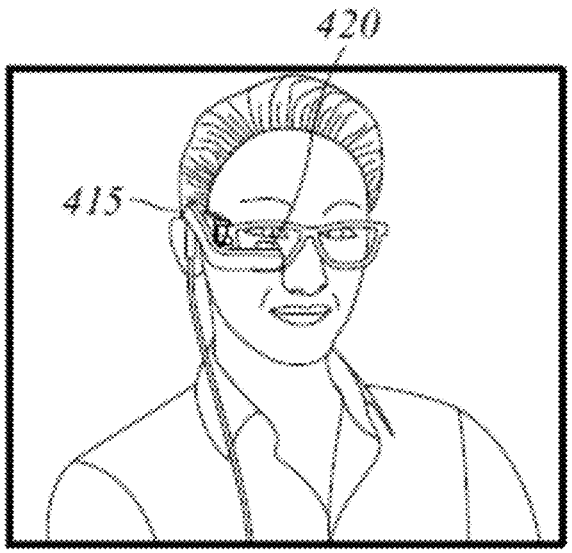
Figure 4C:
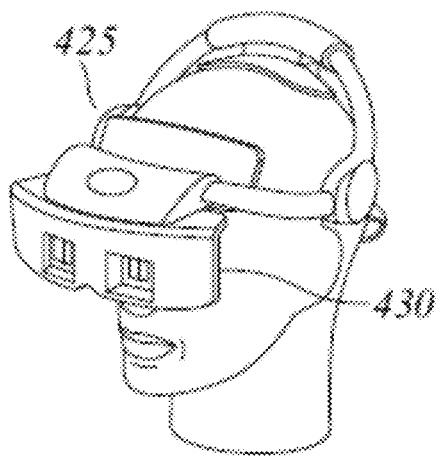
Figure 4D:
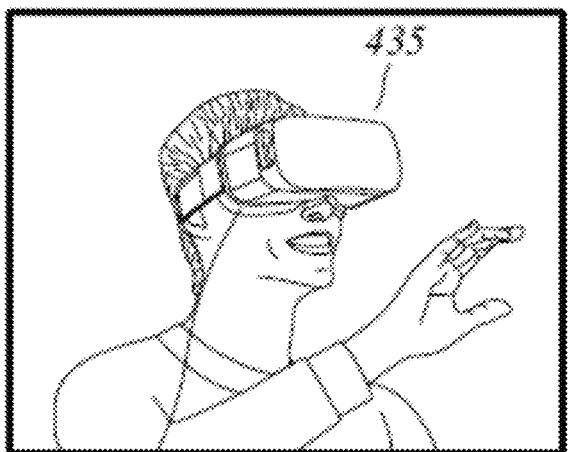

FIG. 3 is a block diagram illustrating a program module according to an embodiment of the present disclosure. The embodiment illustrated in FIG. 3 is for illustration only and other embodiments could be used without departing from the scope of the present disclosure. In the example shown in FIG. 3, although an augmented reality (AR) system is depicted, at least some embodiments of the present disclosure apply equally to a virtual reality (VR) and the augmented reality (AR). Referring to FIG. 3, the program module can include a system operating system (e.g., an OS) 310, a framework 320, and an application 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a BLUETOOTH driver, a shared memory driver, a USB driver, a keypad driver, a Wi-Fi driver, an audio driver, or an inter-process communication (IPC) driver.

According to certain embodiments, the framework 320 (e.g., middleware) can provide, for example, functions commonly required by an application or provide the application with various functions through an application programming interface (API) to allow the application to efficiently use limited system resources inside the electronic device.

The AR framework included in the framework 320 can control functions related to augmented reality mode operations on the electronic device. For example, when running an augmented reality mode operation, the AR framework 320 can control at least one AR application 351, which is related to augmented reality, among applications 330 so as to provide the augmented reality mode on the electronic device.

The application 330 can include a plurality of applications and can include at least one AR application 351 running in the augmented reality mode and at least one normal application 352 running in a non-augmented reality mode, which is not the augmented reality mode.

The application 330 can further include an AR control application 340. An operation of the at least one AR application 351 and/or at least one normal application 352 can be controlled under the control of the AR control application 340.

When at least one event occurs while the electronic device operates in the augmented reality mode, the system operating system 310 can notify the framework 320, for example the AR framework, of an occurrence of an event.

The framework 320 can then control the running of the normal application 352 so that event-related information can be displayed on the screen for the event occurring in the non-augmented reality mode, but not in the augmented reality mode. When there is an application to be run in relation with the event occurring in the normal mode, the framework 320 can perform or provide control to run at least one normal application 352.

According to certain embodiments, when an event occurs while operating in the augmented reality mode, the framework 320, for example the AR framework, can block the operation of at least one normal application 352 to display the information related to the occurring event. The framework 320 can provide the event occurring, while operating in the augmented reality mode, to the AR control application 340.

The AR control application 340 can process the information related to the event occurring while operating in the augmented reality mode to fit within the operation of the augmented reality mode. For example, a 2D, planar event-related information can be processed into 3D information.

The AR control application 340 can control at least one AR application 351 currently running and can perform control to synthesize the processed event-related information for display on the screen being run by the AR application 351 and display the result of the event related information thereon.

According to certain embodiments, when an event occurs while operating in the augmented reality mode, the framework 320 can perform control to block the running of at least one normal application 352 related to the occurring event.

According to certain embodiments, when an event occurs while operating in the augmented reality mode, the framework 320 can perform control to temporarily block the running of at least one normal application 352 related to the occurring event, and then when the augmented reality mode terminates, the framework 320 can perform control to run the blocked normal application 352.

According to certain embodiments, when an event occurs while operating in the augmented reality mode, the framework 320 can control the running of at least one normal application 352 related to the occurring event so that the at least one normal application 352 related to the event operates on the background so as not to influence the screen by the AR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIG. 3 references AR, it can be applied to other scenarios such as mixed reality, or virtual reality etc. Collectively the various reality scenarios can be referenced herein as extended reality (XR).

Various examples of aspects of a user interface (UI) for XR scenarios. It should be noted that aspects of XR UIs disclosed herein are merely examples of XR UIs and are not intended to be limiting.

There are different types of display elements that can be used in XR scenarios. For example, displayed elements are either tied directly to the real world or tied loosely to the XR display space. In world elements are elements that move in relation to the real or virtual environment itself (i.e., move in relation to the environment itself). Depending on the object, in world elements may not necessarily move in relation to the user's head when wearing a head mounted display (HMD).

Heads up display (HUD) elements are elements wherein users can make small head movements to gaze or look directly at various application (app) elements without moving the HUD elements container or UI panel in the display view. HUD elements can be a status bar or UI by which information is visually displayed to the user as part of the display.

FIGS. 4A-4D illustrate examples of a head mounted display (HMD) for use in augmented reality, mixed reality, or virtual reality according to an embodiment of this disclosure. The embodiments of the HMDs shown in FIGS. 4A-4D are for illustration only and other configurations could be used without departing from the scope of the present disclosure.

The HMD can generate an augmented reality environment in which a real-world environment is rendered with augmented information. The HMD can be monocular or binocular and can be an opaque, transparent, semi-transparent or reflective device. For example, the HMD can be a monocular electronic device 405 having a transparent screen 410. A user is able to see through the screen 410 as well as able to see images rendered, projected or displayed on the screen 410. The images may be projected onto the screen 410, generated or rendered by the screen 410 or reflected on the screen 410. In certain embodiments, the HMD is a monocular electronic device 415 having an opaque or non-see-through display 420. The non-see-through display 420 can be a liquid crystal display (LCD), a Light emitting diode (LED), active-matrix organic light emitting diode (AMOLED), or the like. The non-see-through display 420 can be configured to render images for viewing by the user. In certain embodiments, the HMD can be a binocular electronic device 425 having a transparent screen 430. The transparent screen 430 can be a single contiguous screen, such as adapted to be viewed by, or traverse across, both eyes of the user. The transparent screen 430 also can be two transparent screens in when one screen is disposed corresponding to a respective eye of the user. The user is able to see through the screen 430 as well as able to see images rendered, projected or displayed on the screen 430. The images may be projected onto the screen 430, generated or rendered by the screen 430 or reflected on the screen 430. In certain embodiments, the HMD is a binocular electronic device 435 having an opaque or non-see-through display 440. The HMD can include a camera or camera input configured to capture real-world information and display, via the non-see-through display 440, real-world information. The non-see-through display 440 can be an LCD, LED, AMOLED, or the like. The non-see-through display 440 can be configured to render images for viewing by the user. The real-world information captured by the camera can be rendered as a video image on the display with augmented information.

Embodiments of the present disclosure provide a system, method, and algorithm for 3D reconstruction with plane and surface reconstruction, scene parsing, depth reconstruction with depth fusion from different sources. The system, method, and algorithm include creating 3D scene reconstruction with plane reconstruction and surface reconstruction. The planes and surfaces are reconstructed in corresponding divided regions in the captured scene. The system, method, and algorithm also include separating one or more plane regions from one or more surface regions by computing surface normal and associating depth info and position data in a generated grid. The system, method, and algorithm also include integrating the reconstructed planes and the reconstructed surfaces based on the boundaries of the one or more plane regions and the boundaries of the one or more surface regions. Creating scene reconstruction is accomplished by re-meshing the integrated planes and surfaces.

Figure 5A:
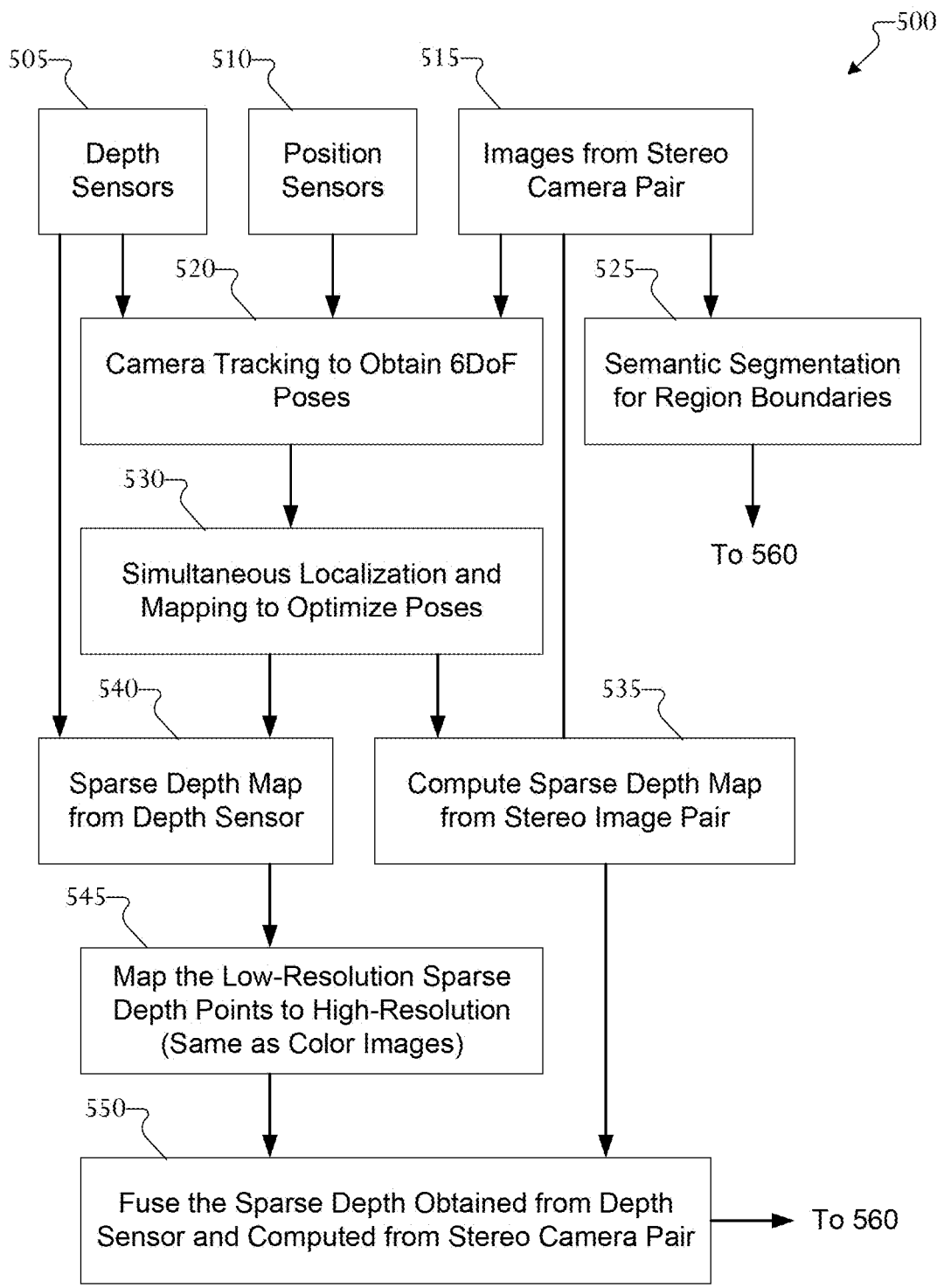
FIGS. 5A and 5B illustrate a process for scene reconstruction with plane and surface reconstruction according to embodiments of the present disclosure.
Figure 5B:
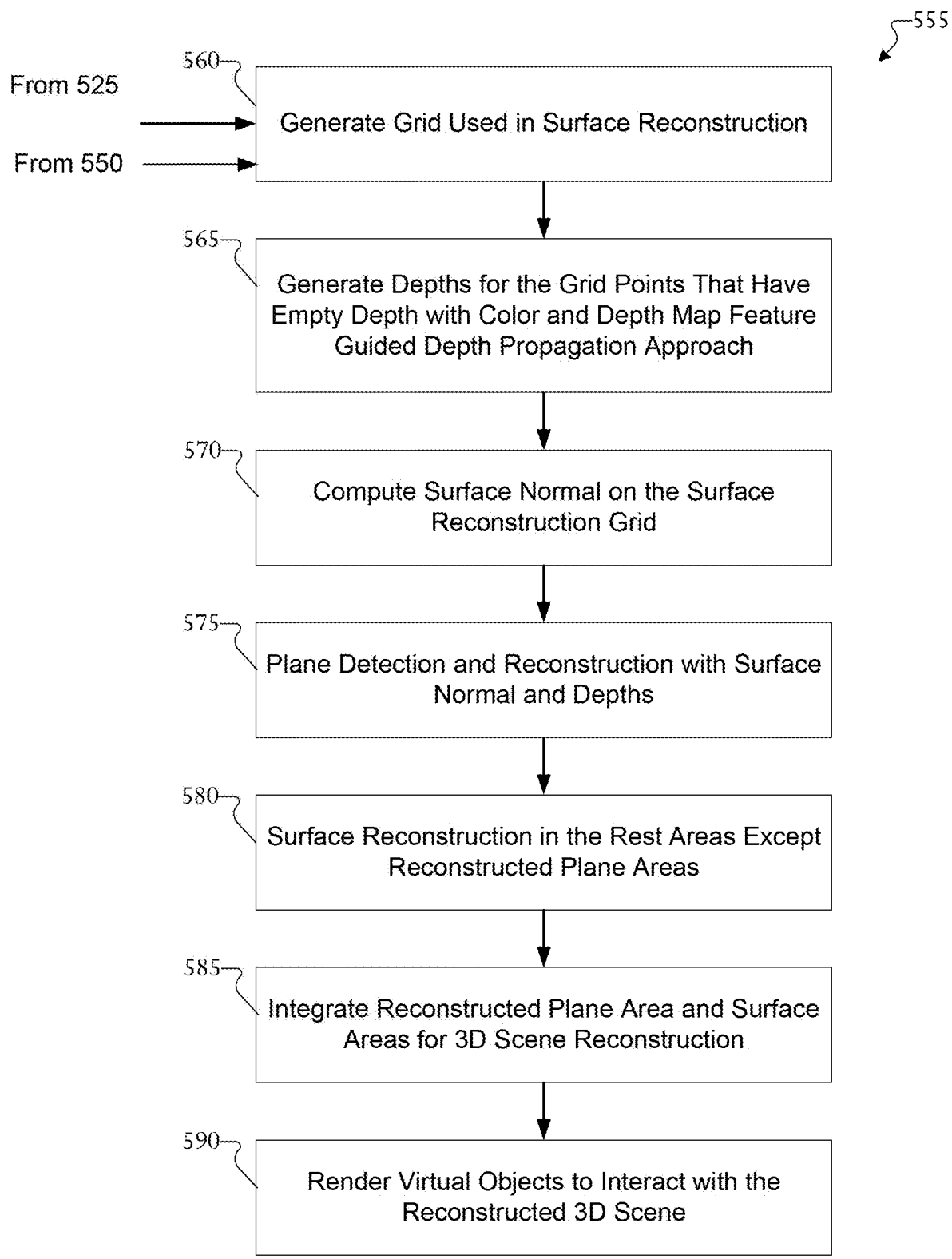

FIGS. 5A and 5B illustrates a process for scene reconstruction with plane and surface reconstruction according to the present disclosure. While FIGS. 5A and 5B depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes 500 and 555 depicted can be implemented by one or more processors in an electronic device, such as by one or more processors 120 of an electronic device 101.

FIGS. 5A and 5B show diagrams of an exemplary process for scene reconstruction with plane and surface reconstruction. The process for scene reconstruction with plane and surface reconstruction can be divided into two parts including depth data acquisition and fusion 500 and 3D scene reconstruction 555.

In the process for depth acquisition and fusion 500, the inputs are received from one or more of depth sensors, position sensors, or a stereo camera pair. For example, in operation 505, depth data is received from one or more depth sensors. In operation 510, position data is received from one or more positions sensors, such as inertial measurement unit (IMU) or a global positioning system (GPS). In operation 515, one or more images, or image frames, are received from the stereo camera pair, such as cameras 195. In operation 520, based on the input data, camera tracking is performed to obtain six degrees of freedom (6DoF) camera poses. That is, the processor uses depth data, position data, and captured images to determine a camera pose and orientation. Additionally, in operation 525, semantic segmentation is performed on the images from the stereo camera pair 515 to obtain the region boundaries of the planes and surfaces in the scene. The processor categorizes and labels pixels in the image into different classes to identify boundaries within the image. In operation 530, the 6DoF camera poses are optimized with simultaneous localization and mapping to obtain more accurate camera poses. During localization and mapping to the scene, visual simultaneous localization and mapping (SLAM) can be utilized to obtain accurate camera poses and 3D feature points of the scene. In operation 535, a sparse depth map is computed. The electronic device 101 reconstructs sparse depths using a stereo image pair from the stereo camera pair, such as camera 195. The resolution of the sparse depth points can be the same as the color image. In certain embodiments, the sparse depths can be reconstructed from structure from motion using camera tracking and visual SLAM. In operation 540, the low-resolution sparse depth points are obtained from depth sensors and mapped to a high-resolution image in operation 545, such as by using visual SLAM. The high-resolution is at least 300 pixels per inch (ppi) and the same as color images. In operation 550, the sparse depths from depth sensors and the sparse depths reconstructed from stereo image pair are fused. A special depth fusion filter is created for merging the sparse depths with confidence levels. The depth fusion filter can also reduce noises and remove false depth points in the depth data. The depth fusion filter is configured to merge the sparse depths together to create a high-resolution sparse depth map. In the depth fusion filter, a highest priority is given to depths from the depth sensor (in operation 505). When the sensor depth has high confidence, such as above one or more predetermined confidence threshold values, the corresponding depth value is utilized as the final depth. When the sensor depth has low confidence, a weighted average of depths from the depth sensor, depth from stereo camera, and depth from structure from motion, is used. A high-resolution sparse depth map is created from the depth data fusion. The procedure of depth data acquisition and fusion 500 is configured to obtain sparse depth maps merged from different sources.

The outputs of operations 525 and 550 are provided to the process for 3D scene reconstruction 555. In the process for 3D scene reconstruction 555, a grid for surface reconstruction is created in operation 560. The grid is constructed based on inputs received from the output of operations 525 and 550. The resolution of the grid depends on the requirements of 3D scene reconstruction.

In the generated grid, each grid point of the grid has respective depth information. In operation 565, the electronic device 101 computes depths for grid points that do not have depths. That is, depths are generated for grid points that have an empty depth with color and depth map feature guided depth propagation approach. Image guided depth propagation approach is used for computing depths to the considered grid points. In the depth propagation process, color texture information, spatial information, and pose information from pixels within a threshold distance of a grid point are used for computing relevant weights. The depths in the of the pixels within a threshold distance of the grid point (also referred to as being "neighborhood of a grid point" are propagated to the considered points with weighting average.

In operation 570, the electronic device 101 computes a surface normal at the grid points with depth and spatial information. That is, the processor computes a surface normal, such as by taking a vector cross product at grid points of the grid based on associated depth info and position data. With the surface normal information, plane areas and non-plane areas are separated. In a plane region, surface normal are parallel and point to the same direction. For example, the electronic device 101 can separate or isolate plane areas and non-plane areas.

Plane detection and reconstruction with a surface normal and depths is performed in operation 575. For example, the electronic device 101 can reconstruct planes, in operation 575, the plane areas and reconstruct surfaces in the non-plane areas in operation 580.

Finally, in operation 585, the reconstructed planes and surfaces are integrated together for 3D reconstruction for the scene. The reconstructed planes and surfaces are integrated by 1) extracting the boundaries of reconstructed plane regions and surface regions; 2) matching boundaries of neighboring regions; and 3) integration.

Since the regions are reconstructed individually, each region has its own boundary. The boundaries are extracted for all regions and stored in a memory. When each individual region is reconstructed, different scales and grid resolutions may be used to reconstruct the planes and surfaces.

After extracting boundaries of reconstructed planes and surfaces, the processor matches corresponding boundaries of neighboring regions. This includes cases including plane with plane, plane with surface, surface with surface, and surface with plane. The neighboring boundaries may not fully overlap since differences in reconstruction, scale, and grid resolution. The corresponding points on both boundaries are transformed and made to overlap.

During reconstruction for each region, vertices of the planes and surfaces are obtained. After boundary matching, overlapped boundary points are present. The processor connects regions with the overlapped boundaries to merge them together. Since different regions may have different meshes, a whole mesh for the scene reconstruction is created.

The processor then re-meshes the integrated regions to create a new mesh. If the vertices in the new mesh are the same as the old meshes, the old vertices are used. Otherwise, new vertices are computed in 3D interpolation from the existing vertices. With the new mesh, the processor can render the entire reconstructed scene.

A 3D mesh is created to present the reconstructed scene. The electronic device 101 can then render virtual objects to interact with the reconstructed 3D scene as an exemplar application in operation 590.

Figure 6:
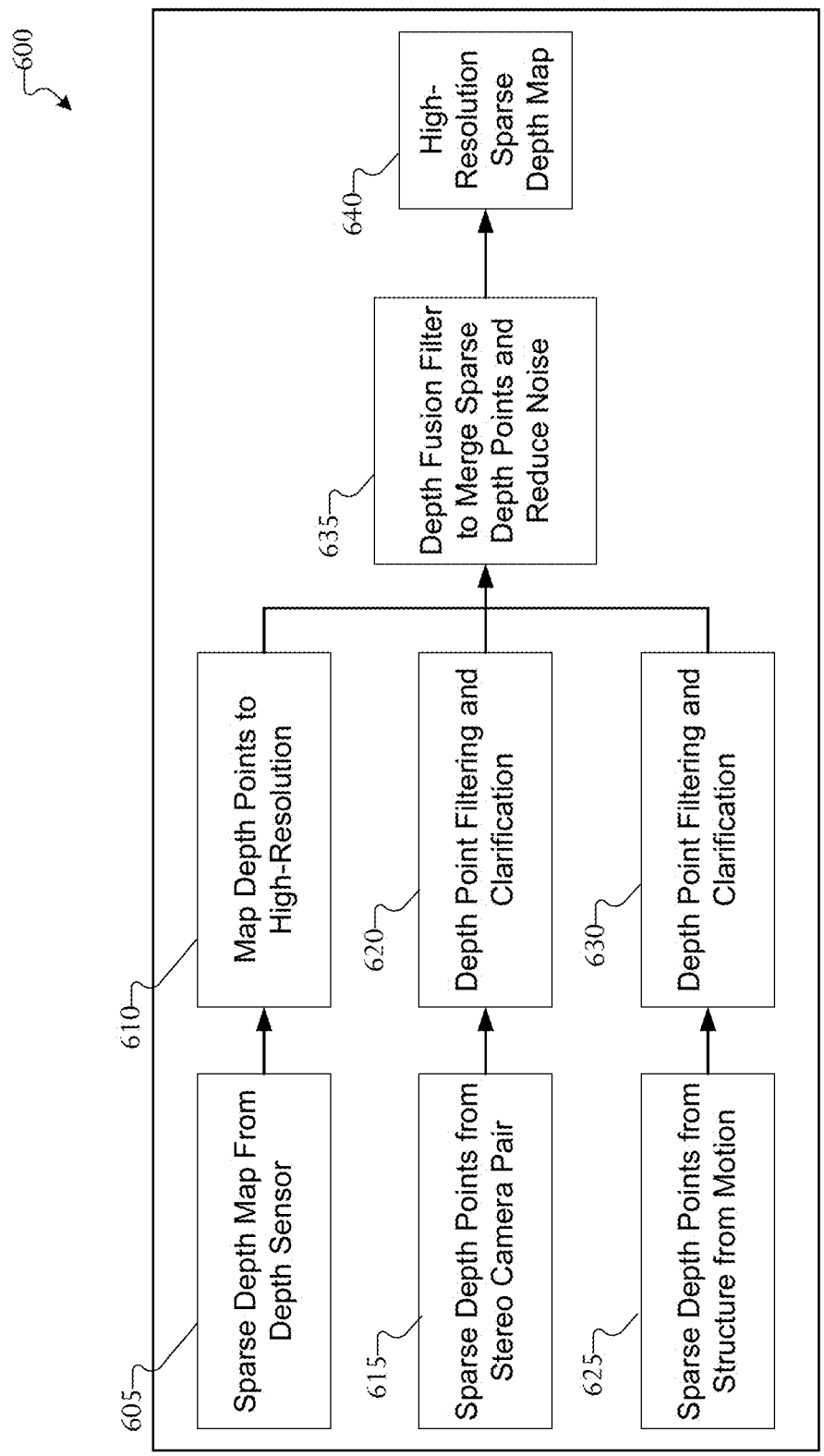
FIG. 6. illustrates example system for depth data acquisition and fusion according to an embodiment of the present disclosure.

FIG. 6. illustrates example system for depth data acquisition and fusion according to the present disclosure. The embodiment of the system 600 shown in FIG. 6 is for illustration only. Other embodiments could be used without departing from the scope of the present disclosure.

In the example shown in FIG. 6, the system 600 is configured to receive inputs from one or more of three sources. The three sources include a depth sensor, a stereo camera pair, and a structure from motion.

The system 600 can received a sparce depth map 605 from the depth sensor. The depth sensor can provide quick low-resolution and high-quality depth map or sparse depth points. Usually, the resolution is lower than the resolution of the corresponding color image. The system 600 maps the depth map to the higher resolution 610 image before using it in 3D reconstruction.

Since many XR devices are equipped with a stereo camera pair, such as camera 195 in electronic device 101, the system 600 is configured to receive sparce depth points 615 from the stereo camera pair. The system 600 can use the stereo image pair from the stereo camera pair to reconstruct sparse depths. Thereafter, based on the sparse depth points, the system 600 performs depth point filtering and clarification 620. Comparing with structure from motion with a single view camera, the stereo camera pair can reconstruct depths of the scene more convenient with less computation.

The system 600 also reconstructs sparse depths from structure from motion 625 using camera tracking and visual slam. During localization and mapping to the scene, visual slam can obtain highly accurate camera poses and 3D feature points of the scene. Thereafter, based on the sparse depth points from structure form motion 625, the system 600 performs depth point filtering and clarification 630.

The system 600 creates an efficient depth fusion filter 635 to merge the sparse depths together to create a high-resolution sparse depth map. In the depth fusion filter, the system 600 prioritizes by applying a highest priority to depths from depth sensor. When the sensor depth has a confidence greater than a predetermined threshold, the system 600 uses the sensor depth having the high confidence as the final depth. When sensor depth has confidence below the predetermined threshold, the system 600 uses a weighted average of depth from sensor, depth from stereo camera, and depth from structure from motion. The system 600 can then obtain a high-resolution sparse depth map 640 after depth data fusion.

Figure 7:
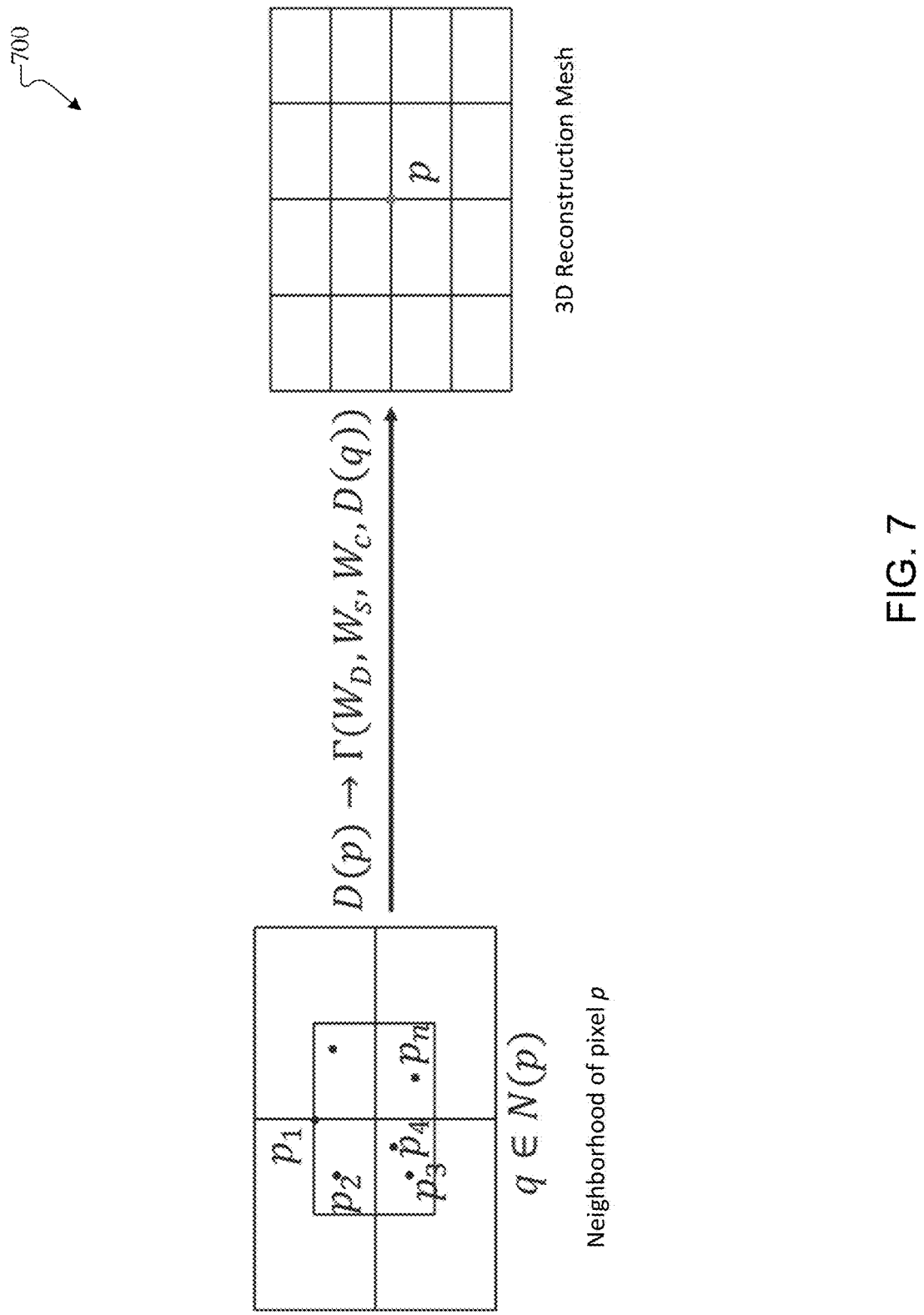
FIG. 7 illustrates an example of depth reconstruction for a 3D reconstruction mesh according to an embodiment of the present disclosure.

FIG. 7 illustrates an example of depth reconstruction for a 3D reconstruction mesh according to the present disclosure. The example of the depth reconstruction shown in FIG. 7 is for illustration only. Other embodiments could be used without departing from the scope of the present disclosure.

From depth data acquisition and fusion, a 3d scene construction system, such as electronic device 101, obtains a high-resolution sparse depth map. The 3D scene construction system creates a 3D reconstruction mesh. On a specific point of the mesh grid, there may be a depth or may not be a depth since only a sparse depth map is present. For the grid points that have depths, the 3D scene construction system uses these depths. For the grid points that do not have depths, the 3D scene construction system reconstructs depths from the sparse depths with image guided depth super resolution approach.

As shown in the example shown in FIG. 7, the depth at pixel p on the mesh grid needs to be reconstructed. The 3D scene construction system creates a depth reconstruction filter to compute the depth at pixel p. Three kinds of weights are computed for the filter from pose information, spatial information, and color information in the neighborhood. The depth at pixel p can be reconstructed according to:

$$D(p) \rightarrow \Gamma(W_D, W_s, W_c, D(q)), \quad (1)$$

where $W_D$ is the weight computed from pose information, $W_s$ is the weight computed from spatial information, $W_c$ is the weight computed from color information, and $D(q)$ is the depth at pixel q, $q \ni N(p)$ is the pixel in neighborhood of pixel p.

In this way, the 3D scene construction system may reconstruct depths at certain grid points, which saves a lot of computation and makes the 3D reconstruction process more efficient.

Figure 8A:
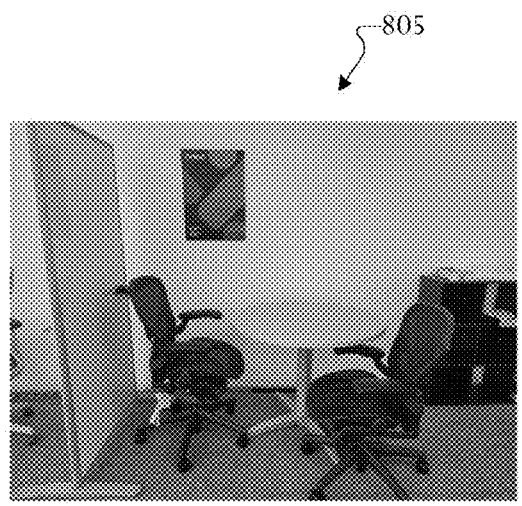
FIGS. 8A and 8B illustrate examples for scene parsing with segmentation and surface normal according to an embodiment of the present disclosure.
Figure 8B:
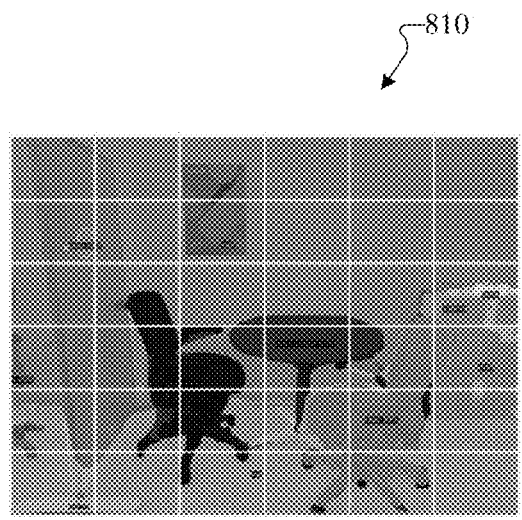

FIGS. 8A and 8B illustrate examples for scene parsing with segmentation and surface normal according to an embodiment of the present disclosure. The examples shown in FIGS. 8A and 8B are for illustration only. Other embodiments could be used without departing from the scope of the present disclosure.

A 3D scene can be composed of planes and surfaces. FIG. 8A shows an example of indoor scene 805. In the indoor scene 805, a lot of planes in the scene include the wall, the floor, table, white board. Plane reconstruction is uses less computational resources and takes less processing time as compared to surface reconstruction, such that plane regions are separated from surface regions.

The 3D scene construction system can apply segmentation to parse the scene into different regions. FIG. 8B shows an example of segmentation 805. After segmentation, the scene is parsed into different regions including wall, floor, table, chairs, bookshelf, and white board. The 3D scene construction system computes surface normal in the 3D reconstruction mesh. With the surface normal, the 3D scene construction system can separate plane regions from surface regions. In a plane region, surface normals are parallel and point in the same direction. The scene parsing approach can be used for cases of both indoor and outdoor scenes to separate plane regions and surface regions for 3D scene reconstruction.

Figure 9:
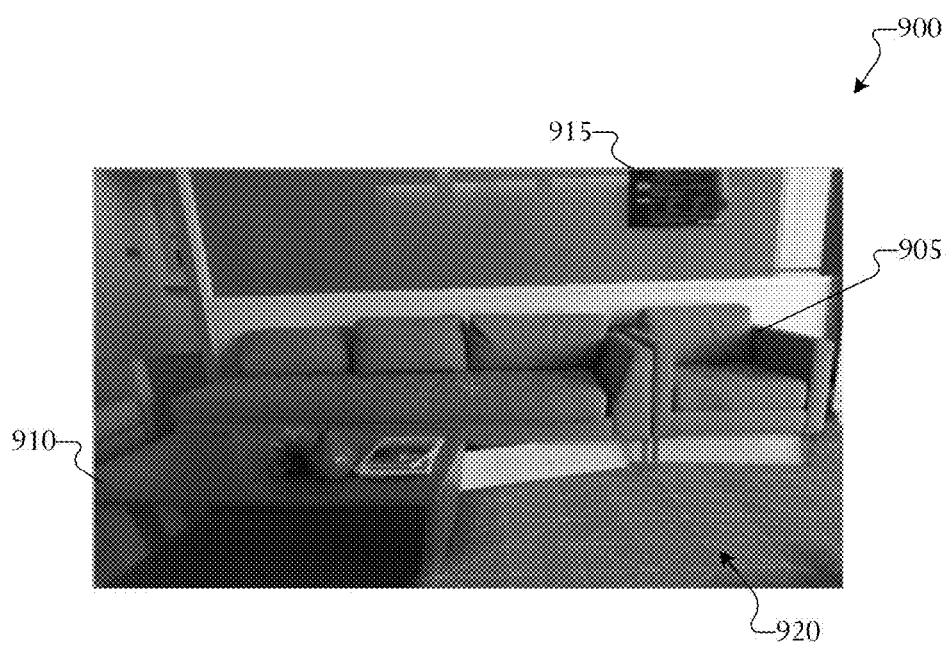
FIG. 9 illustrates an example for plane detection and reconstruction according to an embodiment of the present disclosure.

FIG. 9 illustrates an example for plane detection and reconstruction according to an embodiment of the present disclosure. The example 3D scene 900 shown in FIG. 9 is for illustration only. Other examples could be used without departing from the scope of the present disclosure.

With 3D scene parsing, the 3D scene construction system obtains plane regions and surface regions. The 3D scene construction system reconstructs these planes and surfaces separately with different reconstruction approaches and integrates them together for 3D scene reconstruction. For plane reconstruction, a surface normal of the region provides the direction of the plane. With the parsed region boundary, depths of the region, and camera pose, the 3D scene construction system computes the region boundary in 3D space. In this way, the 3D scene construction system can reconstruct the plane.

For surface regions, the 3D scene construction system reconstructs the surfaces with surface approach such as Poisson surface reconstruction with surface normal and boundary conditions. After completing reconstruction for all regions for planes and surfaces, the 3D scene construction system integrates the reconstructed regions together to build a 3D reconstruction for the scene and uses the 3D reconstruction to XR applications. The 3D scene construction system, such as electronic device 101, can render virtual objects to interact with the 3D scene 900. For example, using the discloses processes and techniques, the electronic device 101 can render the 3D scene 900 by including one or more objects such as couches 905, table 910, and television 915 in a room 920. The electronic device 101 can render the 3D scene to enable an operator to interact with the one or more objects in the 3D scene 900.

Figure 10:
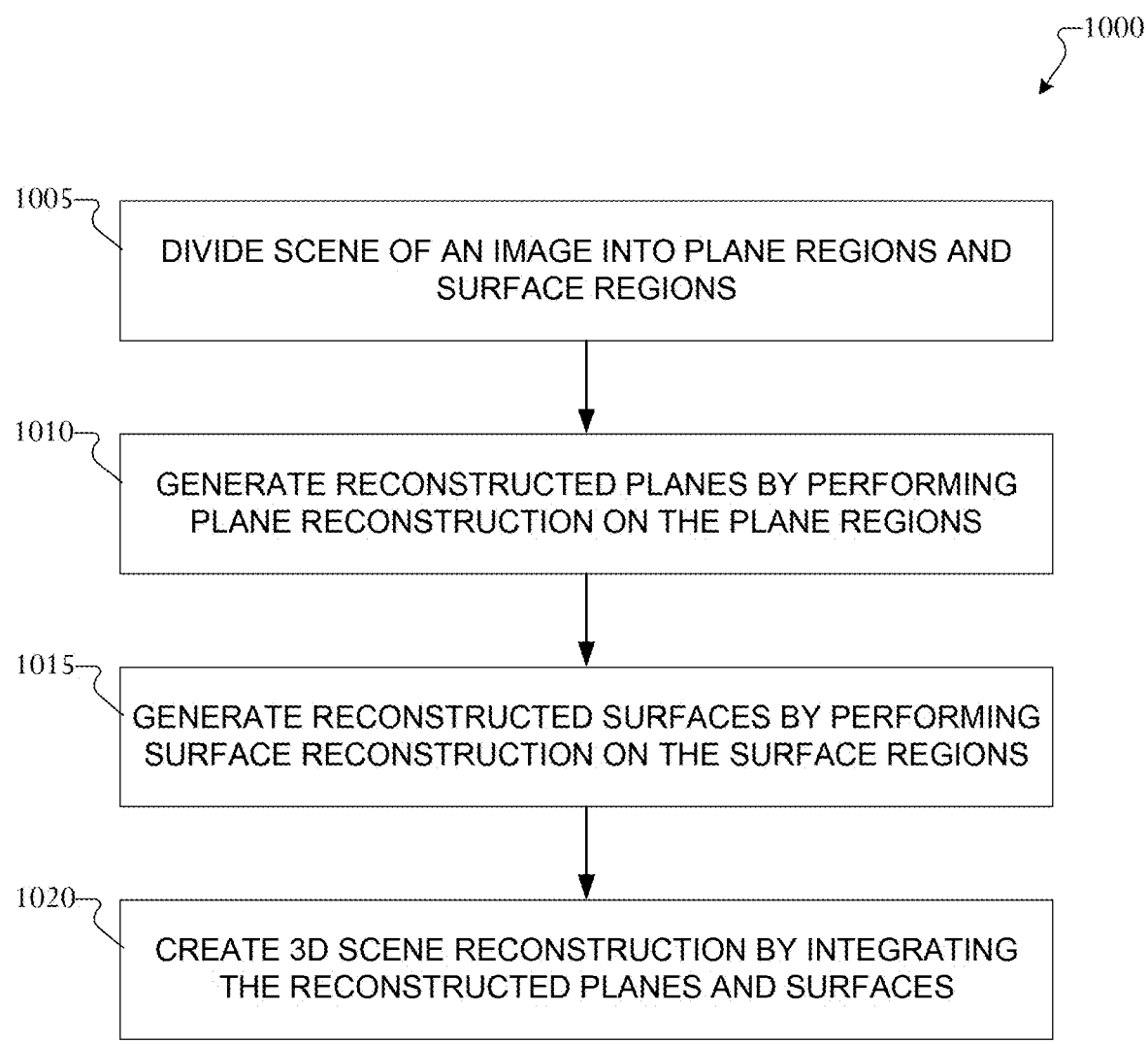
FIG. 10 illustrates a process for scene reconstruction with plane and surface reconstruction according to an embodiment of the present disclosure.

FIG. 10 illustrates a process for scene reconstruction with plane and surface reconstruction according to embodiments of the present disclosure. While FIG. 10 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes 500 and 555 depicted can be implemented by one or more processors in an electronic device, such as by one or more processors 120 of an electronic device 101.

In operation 1005, a scene of an image frame is divided into one or more plane regions and one or more surface regions. For example, a processor 120 in the electronic device 101 separates one or more plane regions from one or more surface regions by computing surface normal and associating depth info and position data in a generated grid.

In operation 1010, reconstructed planes are generated by performing plane reconstruction based on the one or more plane regions. In operation 1015, reconstructed surfaces are generated by performing surface reconstruction based on the one or more surface regions. For example, the processor 120 in the electronic device 101 can perform plane detection and reconstruction and surface detection and reconstruction as described in FIGS. 5A and 5B.

In operation 1020, the 3D scene reconstruction is created by integrating the reconstructed planes and the reconstructed surfaces. For example, he electronic device 101 integrates the reconstructed planes and the reconstructed surfaces based on the boundaries of the one or more plane regions and the boundaries of the one or more surface regions. Creating scene reconstruction is accomplished by re-meshing the integrated planes and surfaces.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for three-dimensional (3D) scene reconstruction comprising:
   segmenting a scene of an image frame into regions;
   dividing the regions into one or more plane regions and one or more non-plane surface regions;
   generating reconstructed planes by performing plane reconstruction based on the one or more plane regions using a first reconstruction approach;
   generating reconstructed surfaces by performing surface reconstruction based on the one or more non-plane surface regions using a second reconstruction approach that is different from the first reconstruction approach; and
   creating the 3D scene reconstruction by integrating the reconstructed planes and the reconstructed surfaces.

2. The method of claim 1, further comprising:
   generating a grid for the image frame with a resolution based on a 3D scene reconstruction requirement, wherein the grid comprises grid points and each grid point of the grid is associated with respective depth information.

3. The method of claim 2, further comprising:
   computing surface normal information at the grid points of the grid based on the respective depth information and position data; and
   dividing the regions into the one or more plane regions and the one or more non-plane surface regions based on the surface normal information.

4. The method of claim 3, further comprising:
   extracting boundaries of the reconstructed planes and the reconstructed surfaces using the surface normal information and associated depth information; and
   integrating the reconstructed planes and the reconstructed surfaces based on the extracted boundaries.

5. The method of claim 2, further comprising:
   distinguishing the one or more plane regions from the one or more non-plane surface regions based on the respective depth information.

6. The method of claim 1, wherein integrating the reconstructed planes and the reconstructed surfaces comprises:
   computing new vertices for a 3D interpolation from existing vertices of the one or more plane regions and one or more non-plane surface regions.

7. The method of claim 1, further comprising:
   applying the 3D scene reconstruction to an extended reality application.

8. An apparatus, comprising:
   a display; and
   a processor coupled to the display and configured to:
      segment a scene of an image frame into regions;
      divide the regions into one or more plane regions and one or more non-plane surface regions;
      generate reconstructed planes by performing plane reconstruction based on the one or more plane regions using a first reconstruction approach;
      generate reconstructed surfaces by performing surface reconstruction based on the one or more non-plane surface regions using a second reconstruction approach that is different from the first reconstruction approach; and
      create a 3D scene reconstruction by integrating the reconstructed planes and the reconstructed surfaces.

9. The apparatus of claim 8, wherein the processor is further configured to:
   generate a grid for the image frame with a resolution based on a 3D scene reconstruction requirement, wherein the grid comprises grid points and each grid point of the grid is associated with respective depth information.

10. The apparatus of claim 9, wherein the processor is further configured to:
    compute surface normal information at the grid points of the grid based on the respective depth information and position data; and
    divide the regions into the one or more plane regions and the one or more non-plane surface regions based on the surface normal information.

11. The apparatus of claim 10, wherein the processor is further configured to:
    extract boundaries of the reconstructed planes and the reconstructed surfaces using the surface normal information and associated depth information; and
    integrate the reconstructed planes and the reconstructed surfaces based on the extracted boundaries.

12. The apparatus of claim 9, wherein the processor is further configured to:
    distinguish the one or more plane regions from the one or more non-plane surface regions based on the respective depth information.

13. The apparatus of claim 8, wherein, to integrate the reconstructed planes and the reconstructed surfaces, the processor is configured to:
    compute new vertices for a 3D interpolation from existing vertices of the one or more plane regions and one or more non-plane surface regions.

14. The apparatus of claim 8, wherein the processor is further configured to:
    apply the 3D scene reconstruction to an extended reality application displayed on the display.

15. A non-transitory computer-readable medium containing instructions that, when executed by a processor, cause the processor to:

segment a scene of an image frame into regions;
divide the regions into one or more plane regions and one or more non-plane surface regions;
generate reconstructed planes by performing plane reconstruction based on the one or more plane regions using a first reconstruction approach;
generate reconstructed surfaces by performing surface reconstruction based on the one or more non-plane surface regions using a second reconstruction approach that is different from the first reconstruction approach; and
create a 3D scene reconstruction by integrating the reconstructed planes and the reconstructed surfaces.

16. The non-transitory computer-readable medium of claim 15, wherein the instructions when executed further cause the processor to:
generate a grid for the image frame with a resolution based on a 3D scene reconstruction requirement, wherein the grid comprises grid points and each grid point of the grid is associated with respective depth information.

17. The non-transitory computer-readable medium of claim 16, wherein the instructions when executed further cause the processor to:
compute surface normal information at the grid points of the grid based on the respective depth information and position data;
divide the regions into the one or more plane regions and the one or more non-plane surface regions based on the surface normal information;
extract boundaries of the reconstructed planes and the reconstructed surfaces using the surface normal information and associated depth information; and
integrate the reconstructed planes and the reconstructed surfaces based on the extracted boundaries.

18. The non-transitory computer-readable medium of claim 16, wherein the instructions when executed further cause the processor to:
distinguish the one or more plane regions from the one or more non-plane surface regions based on the respective depth information.

19. The non-transitory computer-readable medium of claim 15, wherein the instructions that when executed cause the processor to integrate the reconstructed planes and the reconstructed surfaces comprise:
instructions that when executed cause the processor to compute new vertices for a 3D interpolation from existing vertices of the one or more plane regions and one or more non-plane surface regions.

20. The non-transitory computer-readable medium of claim 15, wherein the instructions when executed further cause the processor to:
apply the 3D scene reconstruction to an extended reality application.

* * * * *